United States Patent [19]

Tani et al.

[11] 4,148,851
[45] Apr. 10, 1979

[54] PROCESS FOR PRODUCING THERMOPLASTIC POLYMER SHEETS

[75] Inventors: Yoshio Tani; Eizi Takahashi; Mitunori Hachisuka; Sin Togami, all of Shizuoka, Japan

[73] Assignee: Fuji Photo Film Co., Ltd., Minami-ashigara, Japan

[21] Appl. No.: 813,387

[22] Filed: Jul. 6, 1977

[30] Foreign Application Priority Data

Jul. 6, 1976 [JP] Japan .................. 51-80085

[51] Int. Cl.$^2$ .................. B06B 3/00; B29D 7/02
[52] U.S. Cl. .................. 264/23; 264/130; 264/213; 264/216
[58] Field of Search .................. 264/129, 213, 169, 39, 264/338, 216, 237, 81, 23

[56] References Cited

U.S. PATENT DOCUMENTS

| | | | |
|---|---|---|---|
| 2,119,702 | 6/1938 | Carroll | 264/213 |
| 2,119,727 | 6/1938 | Talbot | 264/213 |
| 2,287,282 | 6/1942 | Tousley | 264/130 |
| 2,866,717 | 12/1958 | Bristol | 264/338 |
| 3,194,866 | 7/1965 | Gibson et al. | 264/213 |
| 3,246,055 | 4/1966 | Pendleton | 264/23 |
| 3,366,721 | 1/1968 | Burdge et al. | 264/129 |
| 3,502,757 | 3/1970 | Spencer | 264/39 |
| 3,576,929 | 4/1971 | Turner et al. | 264/237 |
| 3,686,374 | 8/1972 | Hawkins | 264/22 |
| 3,725,518 | 4/1973 | Gaffnes | 264/167 |
| 3,976,733 | 8/1976 | Havens | 264/237 |
| 4,017,575 | 4/1977 | Heyer | 264/216 |
| 4,069,282 | 1/1978 | Gutermuth et al. | 264/237 |

FOREIGN PATENT DOCUMENTS 1312519 4/1973 United Kingdom .................. 264/237

Primary Examiner—Jay H. Woo
Attorney, Agent, or Firm—Sughrue, Rothwell, Mion, Zinn and Macpeak

[57] ABSTRACT

A process for producing a thermoplastic polymer sheet, especially that of polyethylene terephthalate, which comprises extruding a molten thermoplastic polymer through an extrusion die in the form of a polymer sheet onto the surface of a moving cooling body and supplying a liquid, such as water or an alcohol, in an amount sufficient to adhere the polymer sheet to the surface of the cooling body, as a vapor or fine liquid droplets to the surface of the extruded polymer sheet at a position between the extrusion die and the surface of the cooling body. This ensures good adhesion between the molten polymer in sheet form and the surface of the cooling body, and provides polymer sheets having superior surface properties at higher speeds than in the prior art.

15 Claims, 1 Drawing Figure

U.S. Patent      Apr. 10, 1979      4,148,851
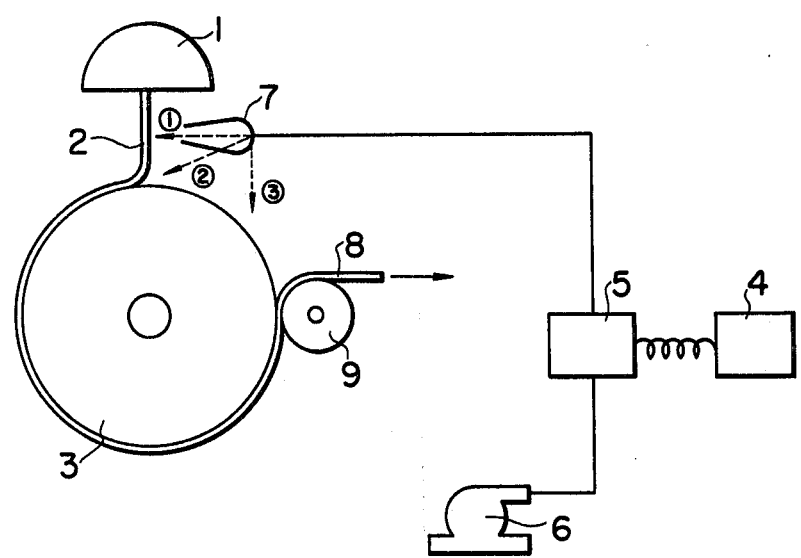

PROCESS FOR PRODUCING THERMOPLASTIC POLYMER SHEETS

BACKGROUND OF THE INVENTION

1. Field of the Invention

This invention relates to a process for producing a thermoplastic polymer sheet. More specifically, it relates to a process for producing a thermoplastic polymer sheet having excellent surface quality and properties by extruding a molten thermoplastic polymer onto the surface of a cooled moving body while bringing them into intimate adhesion to each other.

2. Description of the Prior Art

Generally, thermoplastic polymer sheets are produced by extruding a molten thermoplastic polymer from an extrusion die, casting the polymer over the surface of a forcibly cooled moving body thereby to cool and solidify the polymer as a sheet, and then peeling off the sheet from the surface.

In the present specification, the "cooled moving body" will be referred to simply as a "cooling body" in the sense that it serves to cool a molten thermoplastic polymer which has been extruded in sheet form.

Such a process, however, involves various difficulties, and it is practically impossible to form polymer sheets of the desired quality by this process. First of all, the molten thermoplastic polymer frequently slips on the surface of the cooling body, and "creases" tend to occur on the surface of the cooled and solidified polymer sheet. Secondly, even when slipping does not occur, rapid cooling of the molten polymer on the surface of the cooling body causes a reduction in sheet width, and the resulting sheet tends to have an irregular non-uniform width. Thirdly, air is irregularly entrapped between the molten polymer and the cooling body, and the polymer sheet tends to have raised and depressed portions or an unevenness due to cooling. Fourthly, since the points at which the molten polymer contacts the cooling body are not stable and vary irregularly, an unevenness in thickness or an unevenness due to cooling tends to occur in the polymer sheet. These defects increase as the moving speed of the cooling body is increased to obtain increased output of polymer sheets.

The defects of the prior art have been considered to be due to the insufficient adhesion between the molten polymer and the cooling body, and various attempts have been made to increase the adhesion.

A first attempt was to blow air onto the surface of a molten thermoplastic polymer that has been extruded, or to press the extruded polymer mechanically against a cooling body by means of a press-adhering drum. The former attempt, however, has the defect of restricting the surface properties of the polymer sheet due to disturbance by the air stream, changes in the air pressure, etc.

A second attempt was to use a method which comprises generating an electrostatic charge on the surface of a molten thermoplastic polymer which is to contact the cooling body or on the opposite surface thereof, or on the electrically insulation-coated surface of the cooling body, and simultaneously grounding the cooling body, thereby to generate an electrostatically attractive force due to the difference in the polarity of the electrostatic charge between the molten polymer and the cooling body and to adhere the molten polymer intimately to the cooling body [see, for example, Japanese Patent Publication Nos. 6142/62 (corresponding to U.S. Pat. No. 3,223,757), 3535/73, 14786/73, 14785/73, and 29311/73].

These methods can eliminate almost all of the defects of the prior art described above. However, due to a localized concentration of electrostatic charges, an abruptly increased force is exerted in localized areas in the molten polymer. The polymer is thus subjected to an abrupt change in stress in these areas, and creases or an unevenness in thickness tends to be formed in the polymer sheet. Since the adhesion using this method is too strong, imperfections on the surface of the cooling body are transferred to the polymer sheet. The electrostatic charge remaining after the adhesion, on the other hand, may cause the adhesion of dirt and dust, and specks tend to appear locally on the resulting polymer sheet. When the moving speed of the cooling body is increased in order to increase the output of the polymer sheets, the molten polymer extrudate vibrates between the extrusion die and the cooling body. This causes additional defects such as periodic changes in the width of polymer sheet or the occurrence of an unevenness due to cooling. Hence, neither of these methods provides polymer sheets having an entirely satisfactory quality.

A third attempt includes various methods in which a liquid is interposed between the molten polymer and the cooling body. One such method is disclosed in British Pat. No. 1,312,519. This method uses the electrostatic method described above and simultaneously involves providing an ultrathin film of a heat-conducting liquid on the surface of a cooling body and extruding the molten polymer onto the cooling body thereby to eliminate the defect in which the surface imperfections of the cooling body which are caused by the excessively strong adhesion of the electrostatic method are transferred to the polymer sheet.

In the method of British Pat. No. 1,312,519, the ultrathin film of the heat-conducting liquid on the cooling body such as a cooling roll should be completely removed from the surface thereof as a result of evaporation or of absorption by the polymer before the cooling body is reused (before the cooling body has rotated once, in the case of a cooling roller). The liquid film should be extremely thin since the amount of the liquid film removed is generally very small. The liquid film thickness, which varies according to, for example, the type of thermoplastic polymer or the temperature of the cooling body, should generally be less than several tens of microns. When the polymer is polyethylene terephthalate, the liquid film thickness should be within the range of about 0.5 to about 10 microns. In general, however, it is extremely difficult to provide such an ultrathin film on the surface of a cooling body that is moving, and it is almost impossible to adjust the liquid film thickness to the optimum value for a given thermoplastic polymer, or to control the liquid film thickness in response to changes in the manufacturing conditions. In practice, therefore, a thermoplastic polymer sheet of the desired quality is difficult to obtain using such a method.

The method disclosed in Japanese Patent Application (OPI) No. 99160/74 appears to be based on the same idea as that in this British Patent. This method comprises coating an alcohol having a boiling point of as high as about 150° to about 220° C. and a surface tension at room temperature (about 20°–30° C.) of not more than about 50 dynes/cm on the surface of a cooling body, and extruding a linear polyester resin in the molten state onto the surface of the alcohol coating on the cooling body thereby to cool and solidify the resin. Since the alcohols used in this method do not easily evaporate because of their high boiling points, the amount of the alcohol to be consumed by evaporation is small. Thus, just as in the method of the British Pat. No. 1,312,519, the thickness of the alcohol film should be reduced markedly, and in practice, great difficulty is encountered when this method is used.

A further attempt is disclosed in British Pat. No. 1,140,175. This patent discloses a technique in which molten thermoplastic resin is extruded onto the surface of a cooling body onto which a film of a liquid heat-transfer medium such as water has previously been formed. Even with this technique disadvantages are encountered particularly at higher cooling drum surface speeds. Further even at low surface speeds of the cooling body, minute surface irregularities or roughness occurs in the sheet. The surface irregularities or roughness can be ignored in ordinary use but if the support is used as a photographic substrate the surface irregularities or roughness is quite disadvantageous.

SUMMARY OF THE INVENTION

An object of this invention to provide a process for producing a thermoplastic polymer sheet having excellent surface quality.

Another object of this invention is to provide a process which can be used to produce a thermoplastic polymer sheet having an excellent surface quality at high speeds.

On extensive investigations, it has now been found that the objects of the invention are achieved by a process for producing a thermoplastic polymer sheet which comprises extruding a molten thermoplastic polymer through an extrusion die in the form of a sheet onto the surface of a cooling body which is moving, wherein a liquid in an amount sufficient to adhere the polymer sheet to the surface of the cooling body is supplied in the form of a vapor or fine liquid droplets between the extrusion die and the surface of the cooling body to that surface of the extruded polymer sheet which faces the cooling body and is to come into contact with the cooling body.

BRIEF DESCRIPTION OF THE ACCOMPANYING DRAWING

The FIGURE is a schematic view of an apparatus for producing a thermoplastic polymer sheet in accordance with one embodiment of this invention.

DETAILED DESCRIPTION OF THE INVENTION

Suitable thermoplastic polymers which can be used in this invention in general are those capable of forming a film, for example, polyvinyl resins such as polyvinyl chloride, polyvinyl acetate, polyvinyl ether and polystyrene; polyamide resins such as nylon 6,6; polyimide resins; polyester resins such as polyethyleneterephthalate, polybutyleneterephthalate, and polyethylene-2,6-naphthalate; cellulose resins such as cellulose acetate and methylcellulose; and polyolefin resins such as polyethylene and polypropylene. Additionally, polycarbonates, ABS resins, polyvinyl alcohol, polyacetal, etc. can also be employed. Copolymers comprising monomeric structural units of such polymers; and mixtures of these polymers or copolymers can also be used.

A suitable molecular weight for the thermoplastic polymer should be that which is large enough to form a film, and the viscosity thereof should be within a suitable range for extrusion e.g., from about 800 to about 3,000 poise at the extrusion temperature. Films composed of polyesters have especially superior mechanical properties, dimensional stability, thermal stability, chemical resistance, transparency and electrical properties to other synthetic resin films, and find a wide range of applications, for example as electrical insulation materials, magnetic recording tapes, and photographic film supports. In an especially preferred embodiment, the present invention is applied to the production of polyester films. A suitable molecular weight for the polyester is larger than about 15,000 and a suitable intrinsic viscosity is larger than about 0.6.

The thermoplastic polymer may also contain additives such as stabilizers, fillers, antistatic agents, ultraviolet absorbers, antioxidants, fire retardants, antiblocking agents or slip agents.

The liquid used in the process of this invention will vary depending on the type of thermoplastic polymer used but such should be inert to the thermoplastic polymer. In general, the boiling point of the liquid employed should be higher than the surface temperature of the movable cooling member, and, the liquid should have a suitable volatility so that it easily evaporates from the surface of the polymer sheet, after the sheet is peeled from the cooling member by the peeling roll. More specifically, a preferred boiling point range is about 60° to about 200° C., more preferably 70° to 120° C., most preferably 80° to 100° C. The viscosity of the liquid should be such that the polymer sheet can be easily peeled off from the cooling member by the peeling roll. Specifically, a suitable viscosity for the liquid used should be less than about 5 cps, preferably less than 3 cps, most preferably less than 2 cps. The surface tension of the liquid should be large enough that the polymer sheet can be easily peeled off, more specifically, less than about 100 dyne/cm, preferably less than 80 dyne/cm. As an example, when the thermoplastic polymer is polyethylene terephthalate, suitable liquids which may be used include water, lower alcohols (e.g., ethanol, propanol, butanol, amyl alcohol, hexanol, heptanol, etc.), glycols (e.g., ethylene glycol, etc.) and hydrocarbon solvents (e.g., n-hexane, heptane, octane, decane, cyclohexane, benzene, etc.), which have a boiling point of about 70° to about 120° C., preferably 80° to 110° C., and are readily absorbable by the polyethylene terephthalate. Of the liquids which can be used, in view of the above properties water is most suitable since it is economical and easy to handle and does not need to be recovered. Mixtures of these solvents can be used if desired.

If desired, a surface-active agent may be added to the liquid. The type and amount of the surface-active agent to be used will vary according to the desired use. Examples of suitable surface-active agents which can be used are nonionic surface-active agents such as polyoxyethylene monostearate or polyoxyethylene dilaurate, anionic surface-active agents such as sodium alkylbenzene sulfonates or sodium oleyl-N-methyl tauride, cationic surface-active agents such as heptadecyl ammonium chloride or or trimethyllauryl ammonium chloride, and amphoteric surface-active agents such as laurylamine triacetic acid or stearylamine triacetic acid. A suitable amount of the surface active agent which can be used ranges from about 0.01 to about 1% by weight, preferably 0.01 to 0.3% by weight.

The fine liquid droplets which can be used in this invention should contain droplets which have a diameter of not more than about 15 microns, preferably not more than 10 microns, more preferably not more than 5 microns, at the statistical center of its particle size distribution. Such fine liquid droplets can be obtained by applying ultrasonic vibration to the liquid employed at a frequency of about 1.0 to about 5.0 MHz, preferably 1.1 to 2.0 MHz; or by vaporizing the liquid to form a vapor thereof.

The amount of the liquid to be used will vary depending on, for example, the type of liquid, the type of thermoplastic polymer, and the thickness of the polymer sheet, but suitable amounts are generally about 0.5 to about 10 cc/m$^2$, preferably 1 to 5 cc/m$^2$, more preferably 2 to 3 cc/m$^2$. When the polymer sheet is a polyethylene terephthalate sheet having a thickness of not more than about 3 mm, a suitable amount of the liquid is about 1 to about 4 cc/m$^2$. The amount of the liquid is determined by the sum of the amount of that portion of the liquid which becomes incorporated in the thermoplastic polymer due to a kind of liquid absorption, adsorption, or diffusion while the molten thermoplastic polymer is solidifying on the surface of the cooling body, and the amount of that portion of the liquid which evaporates. Accordingly, when the thermoplastic polymer is a hygroscopic polymer such as a polyester, the use of the liquid in somewhat larger amounts will not appreciably impair the surface properties of the polymer sheet, and the process of the present invention can be applied more advantageously to such polymers.

The temperature of the liquid (i.e., fine particles or vapor) and the temperature of the cooling body significantly affects the surface properties of the polymer sheet. The temperature of the surface of the cooling body should be below the boiling point of the liquid but above the melting point of the liquid. The temperature of the fine particles or vapor of the liquid desirably should be at least about 30° C. higher than the temperature of the cooling body. For example, when air saturated with steam at 80° C. is employed, good results are obtained if the temperature of the surface of the cooling body is substantially not more than about 50° C. If the difference in temperature is less than about 30° C., the liquid component in the fine particles or vapor does not adhere to the surface of the cooling body, and no effect of using the liquid is produced.

The interposed liquid layer between the surface of the cooling body and the thermoplastic polymer should have a uniform thickness. If the thickness of the liquid layer is non-uniform, the surface properties of the polymer sheet are degraded.

The liquid supplying position of a liquid supply nozzle is an important factor in obtaining uniformity of the thickness of the liquid layer. It has been confirmed that better results are obtained by supplying the liquid between the extrusion die and the surface of the cooling body onto that surface of the extruded molten polymer which faces the cooling body than by supplying the liquid directly to the surface of the cooling body. In the case of a direct supply, almost all of the liquid droplets or vapor adhering to the surface of the cooling body forms a liquid layer interposed between the molten polymer and the cooling body. Good results are difficult to obtain, therefore, in this case unless the amount of supply is strictly controlled. In contrast, when the liquid is supplied to the molten polymer between the extrusion die and the surface of the cooling body, the liquid component in the fine particles or vapor adhering to the molten polymer escapes into the atmosphere by evaporation, etc. before the molten polymer contacts the surface of the cooling body. Hence, the desired amount of liquid is obtained automatically. This provides a marked operating advantage because advantageous results can be obtained in this invention even when the amount of the liquid to be fed to the molten polymer is somewhat larger.

The liquid so supplied flows along the surface of the molten polymer, and soon condenses between the polymer sheet and the cooling body. The liquid that has condensed is then pressed by the molten polymer and automatically forms a thin liquid layer between the polymer and the cooling body. It is surprising that when a uniform liquid layer is formed between the molten polymer and the cooling body, a superior adhering effect is obtained without employing an electrostatic charge. The excessive adhering effect associated with the use of an electrostatic charge is not a problem, and a thermoplastic polymer sheet having excellent surface properties can be obtained by the process of this invention.

An embodiment of the invention is described below by reference to the accompanying FIGURE which is a schematic view of an apparatus for producing a thermoplastic polymer sheet in accordance with one embodiment of the invention.

In the drawing, a molten thermoplastic polymer 2 extruded from an extrusion die 1 is cast onto the surface of a cooling drum 3 rotating at a predetermined speed. On the other hand, ultrafine particles of a liquid generated in an ultrasonic atomizing device 5 by means of an ultrasonic generator 4 are passed to a supply nozzle 7 by a fan 6, and supplied to that surface of the molten polymer 2 which faces the cooling drum 3 from a slit portion of the supply nozzle 7. The position at which the liquid is supplied is between the extrusion die 1 and the cooling drum 3 and onto that surface of the molten polymer 2 which faces the cooling drum 3. The ultrafine liquid particles so supplied condense between the molten polymer 2 and the cooling drum 3, and are pressed by the polymer 2 and the cooling drum 3 to automatically form a thin liquid layer interposed between the polymer 2 and the cooling drum 3. Thus, the molten polymer 2 is intimately adhered to the surface of the cooling drum 3. Since the thin liquid layer interposed between the surface of the cooling drum 3 and the surface of the molten polymer 2 has a uniform thickness, the adhesion of the molten polymer 2 to the surface of the cooling drum 3 is excellent. The thermoplastic polymer sheet 8 which has been cooled and solidified on the surface of the cooling drum 3 after intimate adhesion is peeled off from the surface of the cooling drum 3 by a peeling roll 9, and conveyed to subsequent processing.

It should be understood that the present invention is not to be construed as being limited to the embodiment described above, and various changes and modifications therein are possible.

For example, in the embodiment described above, the liquid is supplied by ultrasonic vibration, but the liquid may be vaporized and supplied in the form of a vapor. Since, however, a liquid having a certain range of particle size distribution statistical center must be supplied in amounts which will vary according to the type of liquid, the type of thermoplastic polymer, and the thickness of the polymer sheet, it is preferred to utilize ultrasonic vibration with which the particle diameter and amount of the liquid can be easily changed by changes in the frequency of the ultrasonic waves. In another embodiment, the cooling body may be a cooling belt instead of a cooling drum. In still another embodiment, instead of supplying fine liquid particles to the molten polymer by means of a supply nozzle, the neighborhood of the liquid supplying position may be covered with a chamber, and the fine liquid droplets can be adhered to the surface of the molten polymer all in a uniformly dispersed state.

The present invention offers many new advantages, some of which are set forth below.

(1) The molten polymer can be intimately adhered to the surface of the cooling body by providing a liquid layer between the polymer and the cooling body. This good adhesion leads to the elimination of surface imperfections, width variations, etc. of the polymer sheet which occur when conventional techniques are used because of the insufficient adhesion when conventional techniques are used.

(2) Good adhesion between the molten polymer and the cooling body can be achieved by merely interposing a liquid layer between them instead of using an electrostatic charge to achieve adhesion. This prevents a transfer of the imperfections of the cooling body to the thermoplastic polymer sheet, which is caused by the excessively strong adhering effect observed in the case of using an electrostatic attracting force, and a thermoplastic polymer sheet having excellent surface properties can be obtained.

(3) The defects associated with the insufficient adhesion between the molten polymer and the cooling body can be eliminated, and no vibration of the polymer sheet occurs unlike that which occurs when an electrostatic attracting force is used. Production of the polymer sheet can therefore be performed at higher speeds.

(4) The liquid can be interposed in the form of a vapor or fine particles between the molten polymer and the cooling body, and the thickness of the liquid layer can be controlled. It is possible, therefore, to easily change the polymer to be extruded or to change the operating conditions employed.

(5) Since the liquid is supplied to the molten polymer without being directly applied to the surface of the cooling body, the amount of the liquid is automatically adjusted to the desired value as a result of escaping of the liquid into the atmosphere by evaporation, etc. or of absorption of the liquid by the molten polymer before the liquid forms a layer between the surface of the extruded molten polymer and the surface of the cooling body. Hence, a thermoplastic polymer sheet having excellent surface properties can be obtained by a very easy operation.

The following examples are given to illustrate the present invention more specifically.

EXAMPLES

Using an apparatus for forming a thermoplastic polymer sheet as shown in the FIGURE, a liquid film was formed between a cooling drum and a molten thermoplastic polymer, and a thermoplastic polymer sheet was produced at various surface speeds of the cooling drum.

Specifically, polyethylene terephthalte having an intrinsic viscosity of 0.65 was dried, and melted at 290° C. in an extruder with a screw diameter of 150 mm. The molten polymer was extruded through a flat extrusion die of a conventional type while adjusting the rate of extrusion so that the as-extruded polymer would have a width of 900 mm and a thickness of 2 mm. The sheet-forming apparatus and the operating conditions used are shown in Table 1 below. The liquid, supplying positions were varied as shown at ①, ② and ③ in Table 1 and in the FIGURE.

Table 1

| | |
|---|---|
| Surface speed of the Cooling Drum | 10, 20, 30, 40, 60 m/min. |
| Temperature of the Cooling Drum | 15° C. |
| Diameter of the Cooling Drum | 1000 mm |
| Point of Supply of the Liquid Spray | ① Between the extrusion die and the cooling drum and onto that surface of the molten polymer which faced the cooling drum |
| | ② Contracting point between the molten polymer and the cooling drum |
| | ③ On the cooling drum [away from the position ②] |
| Spray Liquid | Water |
| Frequency of Ultrasonic Vibration | 1350 KHz ± 50 KHz |
| Amount of Water Atomized | 19 cc/min. to 120 cc/min. |

The surfaces of the thermoplastic polymer films obtained after cooling were examined, and the results obtained are shown in Table 2 below. The conventional method described in Table 2 was the production of the polymer sheet without supplying a liquid.

Table 2

| Run No. | Surface Speed of Cooling Drum (m/min.) | Amount of Liquid Coated (cc/min.) | Polymer Sheet Surface Condition | | | Conventional Method |
|---|---|---|---|---|---|---|
| | | | ① | ② | ③ | |
| 1 | 10 | 19 | Good | Good | Good | Good |
| 2 | 20 | 40 | Good | Good | Good | Slightly poor |
| 3 | 30 | 60 | Good | Good | Slightly poor | Slightly poor |
| 4 | 40 | 85 | Good | Good | Slightly poor | Slightly poor |
| 5 | 60 | 120 | Good | Slightly poor | Slightly poor | Slightly poor |

The "Amount of Liquid Coated" in Table 2 is the amount coated per 900 mm width of the sheet.

It can be seen from the results in Table 2 that according to the conventional method, a thermoplastic polymer sheet having superior surface properties cannot be produced at high drum speeds of 20 m/min. or more. The probable reason is that at increased surface speeds of the cooling drum, it is extremely difficult to form a uniform liquid film on the surface of the cooling drum using a coating roll. In contrast, according to the present invention, thermoplastic polymer sheets having excellent surface quality can be produced even at drum speeds of 20 m/min. or more.

It was further confirmed that the best position of supplying the liquid was at point ① shown in the FIGURE at which point the molten polymer has not yet contacted the cooling body.

While the invention has been described in detail and with reference to specific embodiments thereof, it will be apparent to one skilled in the art that various changes and modifications can be made therein without departing from the spirit and scope thereof.

What is claimed is:

1. A process for producing a thermoplastic polymer sheet which comprises extruding a molten thermoplastic polymer capable of forming a film through an extrusion die in the form of a polymer sheet onto the surface of a moving cooling body and supplying a liquid, in an amount sufficient to adhere the polymer sheet to the surface of the cooling body in the form of a vapor or fine liquid droplets thereof and at a position between the extrusion die and the surface of the cooling body, to that surface of the extruded polymer sheet which faces the cooling body and is to contact the cooling body.

2. The process of claim 1, wherein said thermoplastic polymer has a viscosity of about 800 to about 3,000 poises when molten.

3. The process of claim 1, wherein the amount of the liquid is supplied about 0.5 to about 10 cc/m$^2$ of extruded polymer sheet.

4. The process of claim 1, wherein the temperature of the liquid is at least about 30° C. higher than the temperature of the surface of the cooling body.

5. The process of claim 1, wherein the process includes forming the droplets of the liquid by applying ultrasonic vibration to the liquid.

6. The process of claim 5, wherein the frequency of the ultrasonic vibration is about 1.0 to about 5.0 MHz.

7. The process of claim 1, wherein the droplets of the liquid have a droplet diameter of not more than about 30 15 microns at the statistical center of their particle size distribution.

8. The process of claim 1, wherein the boiling point of the liquid is above the temperature of the surface of the cooling body but the melting point of the liquid is below the temperature of the surface of the cooling body.

9. The process of claim 1, wherein the boiling point of the liquid is about 60° C. to about 200° C., the viscosity of the liquid is below about 5 centipoise and the surface tension of the liquid is below about 100 dyne/cm.

10. The process of claim 1, wherein the liquid is water.

11. The process of claim 1, wherein the thermoplastic polymer is polyethylene terephthalate.

12. The process of claim 11, wherein the molecular weight of the polyethylene terephthalate is above about 15,000 and the intrinsic viscosity of the polyethylene terephthalate is above about 0.6.

13. The process of claim 11, wherein the extruded polymer sheet has a thickness of about 3 mm or less and the amount of the liquid supplied is about 1 to about 4 cc/m$^2$ of the extruded polymer sheet.

14. The process of claim 11, wherein the boiling point of the liquid is about 60° C. to about 200° C., the viscosity of the liquid is below about 5 centipoise and the surface tension of the liquid is below about 100 dyne/cm.

15. The process of claim 11, wherein the liquid is water.

* * * * *